(12) United States Patent (10) Patent No.: US 8,472,222 B2
Schoenlinner et al. (45) Date of Patent: Jun. 25, 2013

(54) METHOD FOR OPERATING AN INVERTER, AND INVERTER

(75) Inventors: Markus Schoenlinner, Tittmoning (DE); Norbert Huber, Teisendorf (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 409 days.

(21) Appl. No.: 12/891,425

(22) Filed: Sep. 27, 2010

(65) Prior Publication Data

US 2011/0080147 A1 Apr. 7, 2011

(30) Foreign Application Priority Data

Oct. 1, 2009 (DE) .......................... 10 2009 047 936

(51) Int. Cl.
*H02M 7/537* (2006.01)
(52) U.S. Cl.
USPC .......................................................... 363/131
(58) Field of Classification Search
USPC ...................................... 363/95, 97, 131, 132
See application file for complete search history.

(56) References Cited

U.S. PATENT DOCUMENTS

| | | | |
|---|---|---|---|
| 6,104,624 A | 8/2000 | Iwamoto et al. | |
| 7,522,437 B2 * | 4/2009 | Konishi et al. | 363/132 |
| 7,660,138 B2 * | 2/2010 | Hallak | 363/97 |
| 8,023,297 B2 * | 9/2011 | de Rooij et al. | 363/132 |
| 8,143,856 B2 * | 3/2012 | Andrea et al. | 320/128 |

FOREIGN PATENT DOCUMENTS

| | | |
|---|---|---|
| DE | 10 2005 046 379 | 4/2007 |
| DE | 10 2006 010 694 | 9/2007 |
| DE | 10 2007 026 393 | 12/2008 |
| WO | WO 2005/109614 | 11/2005 |
| WO | WO 2006/032694 | 3/2006 |

OTHER PUBLICATIONS

European Search Report, dated Jan. 25, 2012, issued in corresponding European Patent Appln. No. 10170278.5.

* cited by examiner

*Primary Examiner* — Matthew Nguyen
(74) *Attorney, Agent, or Firm* — Kenyon & Kenyon LLP

(57) ABSTRACT

In an inverter and a method for operating an inverter, the inverter includes a step-up converter circuit, a dynamic intermediate circuit, and a step-down converter circuit for converting a direct voltage of a direct voltage generator or string into an alternating voltage for supplying a network. The step-up converter circuit increases the direct voltage if the latter is lower than a peak-to-peak maximum of the network voltage, and the step-down converter circuit lowers a dynamic intermediate circuit voltage, as needed, to a lower voltage currently required in the network. The step-up converter circuit dynamically increases the direct voltage to the value currently required in the network and in the process temporarily supplies an approximately sinusoidal voltage curve for the intermediate circuit voltage.

10 Claims, 3 Drawing Sheets

METHOD FOR OPERATING AN INVERTER, AND INVERTER

CROSS-REFERENCE TO RELATED APPLICATIONS

The present application claims priority to Application No. 10 2009 047 936.8, filed in the Federal Republic of Germany on Oct. 1, 2009, which is expressly incorporated herein in its entirety by reference thereto.

FIELD OF THE INVENTION

The present invention relates to a method for operating an inverter and to an inverter suitable for this purpose.

BACKGROUND INFORMATION

Inverters are used to convert an existing direct voltage into an alternating voltage, in order to supply the latter to an alternating current network, for example. In particular in the application in the area of photovoltaics, the highest possible efficiencies are required in this connection.

German Published Patent Application No. 10 2006 010 694 describes a solar inverter, in which two direct voltage sources or solar generators are connected in series, and the connection point forms a first voltage level or a mid-voltage. The two external terminals of the solar generators respectively form a positive and a negative voltage level. Starting from these two levels, the generator voltage is increased above the maximum positive and negative network voltage by a respective step-up converter in the event that the generator voltage is lower than the maximum network voltage. The circuit thus operates with five different, fixed voltage levels. The network phases are then supplied via step-down converters from the respective—in terms of absolute value—next-higher voltage level, the free-wheeling running over the—in terms of absolute value—next-lower voltage level. In addition to the relatively high circuit expenditure, a disadvantage is that in this case the step-up converters and step-down converters produce unnecessary switching losses since in certain operating states the generator voltage is increased to a value from which the actually required voltage level must be generated using a step-down converter. In addition, two solar generators are required to operate this inverter, which must provide as identical a power as possible. This is not always guaranteed, e.g., in the event of a shading of one of the modules.

German Patent No. 10 2007 026 393 describes a solar inverter, in which a step-up converter continually raises a generator voltage to a higher level, but where power is withdrawn from this level in an extended operating mode only when the generator voltage is so low that a storage choke can no longer be magnetized as desired. In this case, the step-up converter operates with a fixed voltage level, from which in turn a step-down converter must generate the currently required voltage level.

SUMMARY

Example embodiments of the present invention provide a method for operating an inverter that allows for improved efficiency and provides an inverter by which this method may be implemented.

According to example embodiments of the present invention, in an inverter, and method for operating an inventor, the inverter includes a step-up converter circuit, an intermediate circuit, and a step-down converter circuit for converting a direct voltage of a solar generator into an alternating voltage to be supplied to a network. The step-up converter circuit increases the direct voltage if it is lower than the current value of the network voltage. The step-down converter circuit decreases an intermediate circuit voltage, as needed, to a lower voltage that is currently required in the network. The step-up converter circuit increases the direct current dynamically to the value currently required in the network and thus provides temporarily an approximately sinusoidal voltage curve for the intermediate circuit voltage.

Reference to a dynamic intermediate circuit or a dynamic intermediate circuit voltage should be understood to refer to an at least temporary adaptation of the intermediate circuit voltage to the voltage currently required in the network, in contrast to conventional intermediate circuits in similar applications, in which the intermediate circuit is kept at a fixed voltage.

The inverter described herein has a dynamic intermediate circuit, which is supplied by the generator with direct voltage, which is increased by two symmetrical step-up converters connected in an incoming circuit to the dynamic intermediate circuit if the required network voltage is above the generator voltage. Power is supplied from the dynamic intermediate circuit to the network, the supplied voltage being lowered by two symmetrical step-down converters connected in an outgoing circuit to the dynamic intermediate circuit if the dynamic intermediate circuit voltage is above the currently required value.

The inverter requires only one solar generator as a direct voltage source. The direct voltage is symmetrical with respect to a mid-voltage level. If the direct voltage supplied by the solar generator is lower than the currently required network voltage, then the step-up converters increase the generator voltage and thus the dynamic intermediate circuit voltage just to the required network voltage. This avoids having to take a step-down converter into operation at the same time. The latter is only put into operation if the generator voltage is above the currently required network voltage.

The circuit also makes do with three voltage levels, the power being supplied, for example, via the positive and the negative voltage level and the return via the mid-voltage level in between, which may be grounded.

With the approach described herein it is possible to supply one phase of a network from one solar generator. In order to supply, e.g., a three-phased network, this circuit may be used three times. For example, the phases may all be supplied from one single dynamic intermediate circuit. In that case, the two step-up converters associated with a respective generator must increase the generator voltage to the highest of all currently required phase voltages. The individual phases are then supplied via separate step-down converters, which must reduce the dynamic intermediate voltage to the respectively required phase voltage.

According to an example embodiment of the present invention, a method for operating an inverter for converting a direct current voltage of a solar generator into an alternating current voltage for supplying power to a network, in which the inverter including a step-up converter circuit, a dynamic intermediate circuit, and a step-down converter circuit, includes: increasing, by the step-up converter circuit, the direct current voltage if the direct current voltage is lower than a peak-to-peak maximum of the network voltage; lowering, by the step-down converter circuit, an intermediate circuit voltage, as needed, to a lower voltage currently required in the network; and dynamically increasing, by the step-up converter circuit, the direct voltage to a value currently required in the network and temporarily supplying an approximately sinusoidal voltage curve for the intermediate circuit voltage.

The method may include raising, by the step-up converter circuit, one of (a) a positive and (b) a negative voltage level of the solar generator with respect to a mid-voltage level in terms of absolute value to the value currently required in the network and increasing a dynamic intermediate circuit voltage to the raised value if one of (a) the positive and (b) the negative voltage level is lower in terms of absolute value than the voltage currently required in the network with respect to the mid-voltage level.

The method may include supplying a plurality of network phases with power from the dynamic intermediate circuit, wherein a separate step-down converter circuit is supplied with power from the dynamic intermediate circuit for each phase.

The plurality of network phases may consist of three phases.

The method may include dynamically regulating, by the step-up converter, to a highest power supply voltage currently required in the network phases if the direct current voltage is below the highest power supply voltage.

The method may include supplying power, by multiple solar generators, to the dynamic intermediate circuit via a respectively associated step-up converter circuit.

The solar generator that supplies a currently highest direct voltage may constitute a master string, and the method may include supplying, by step-up converter circuits associated with remaining solar generators, a voltage that corresponds to the voltage supplied by at least one of (a) the master string and (b) the step-up converter associated with the master string to the dynamic intermediate circuit.

According to an example embodiment of the present invention, an inverter for converting a direct current voltage of a solar generator into an alternating current voltage for supplying power to a network, includes: a step-up converter circuit; a dynamic intermediate circuit; and a step-down converter circuit. The step-up converter circuit is adapted to increase the direct current voltage if the direct current voltage is lower than a peak-to-peak maximum of the network voltage. The step-down converter circuit is adapted to lower an intermediate circuit voltage, as needed, to a lower voltage currently required in the network. The step-up converter circuit is adapted to dynamically increase the direct current voltage to the value currently required in the network and to temporarily supply an approximately sinusoidal voltage curve for the intermediate circuit voltage.

A plurality of solar generators, each having an associated step-up converter circuit, may be arranged to supply power to the dynamic intermediate circuit.

The dynamic intermediate circuit may be adapted to supply a plurality of network phases with power via step-down converter circuits respectively associated with the network phases.

Further features and aspects of example embodiments of the present invention are described in more detail below with reference to the appended Figures.

DETAILED DESCRIPTION

Figure 1:
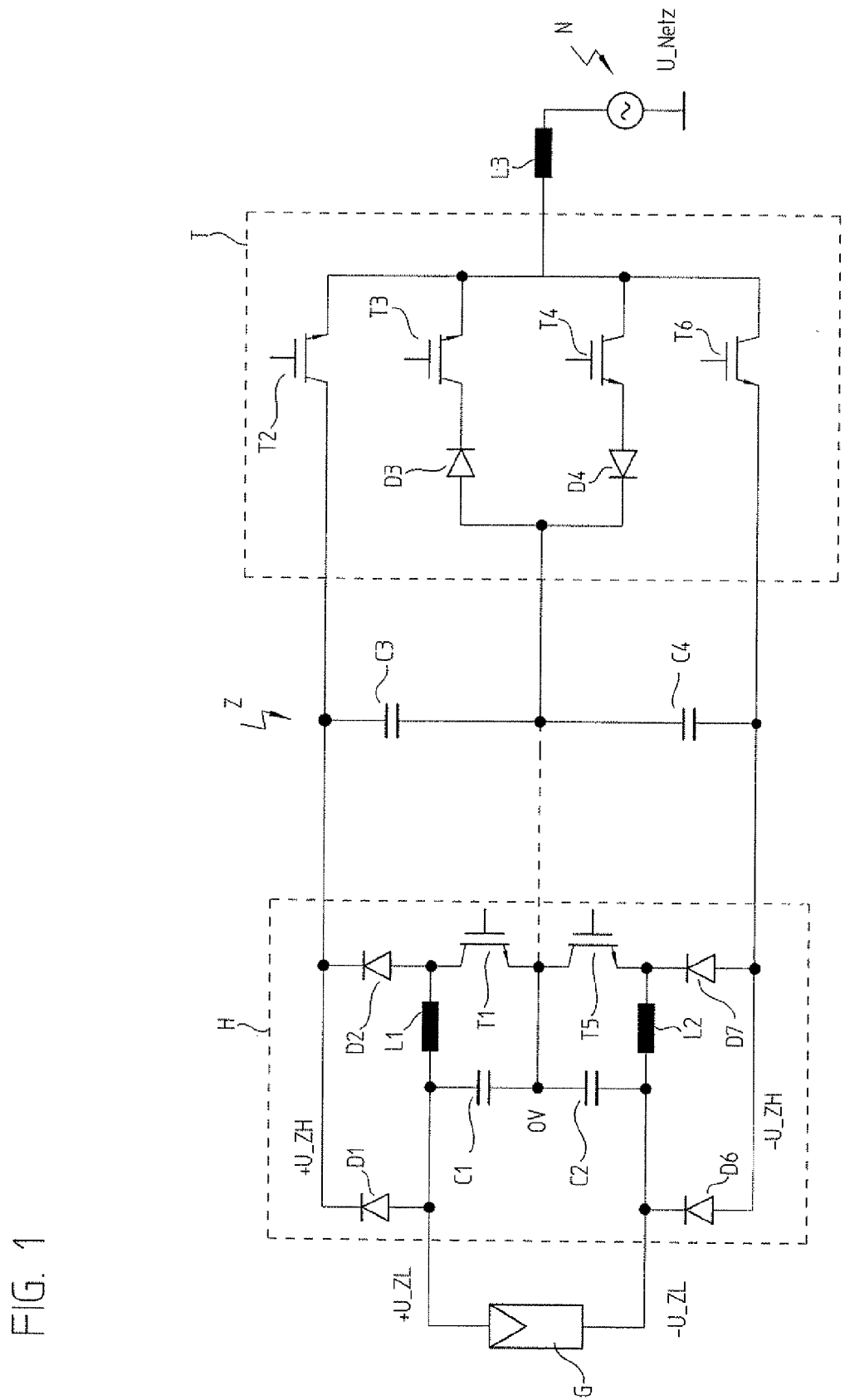
FIG. 1 schematically illustrates a solar inverter circuit for supplying power to a network phase.

A solar generator G is schematically illustrated in FIG. 1. This solar generator provides a direct voltage, which substantially depends on the current light intensity, but also on other parameters such as the operating temperature or the age of modules M. Two capacitors C1 and C2, which are connected in series and are parallel to generator G, create a mid-voltage level, which is designated here as 0V. This level may be grounded, but a grounding may also be omitted. Without grounding at the connection point of C1 and C2, small voltage ripples occur on generator G, a fact that makes it easier to maintain the operating point at the so-called maximum power point, at which solar generator G is most efficient, or which makes it possible to select the capacitance of the dynamic intermediate circuit to be smaller for the same MPP efficiency.

The positive voltage level +U_ZL of generator G is connected to a dynamic intermediate circuit Z via a first diode D1. In addition, +U_ZL is also connected to the mid-voltage level via an inductor L1 and a semiconductor switch element T1. As long as the generator voltage suffices to charge the dynamic intermediate circuit Z at least to the voltage currently required in the phase of network N that is to be supplied with power, T1 is blocking, and the generator voltage is applied to the dynamic intermediate circuit via D1.

If the generator voltage is too low for this purpose, however, a pulsed operation is started at T1. As a consequence, a current respectively flows briefly through L1, which results in an increased voltage on L1 when T1 is switched off. Circuits operating according to this principle, which transform a direct voltage into a higher direct voltage, are referred to as step-up converters. Between L1 and T1, the increased voltage is tapped via a second diode D2 and supplied to dynamic intermediate circuit Z. Since the latter's potential, which is indicated in FIG. 1 by +U_ZH, is higher than +U_ZL, D1 blocks and disconnects generator G from dynamic intermediate circuit Z.

Constructed analogously and identical in its functionality, the lower step-up converter, as needed, also operates with inductor L2 and semiconductor switch element T5 for negative generator voltage −U_ZL. Diode D6 connects generator G directly to dynamic intermediate circuit Z when the lower step-up converter is not in operation, while diode D7 conducts the negative generator voltage increased by the lower step-up converter to dynamic intermediate circuit Z. The two step-up converters for the positive and negative generator voltage are situated symmetrically to the mid-voltage level and form step-up converter circuit H in FIG. 1. This circuit is referenced below without representing it again in detail.

Dynamic intermediate circuit Z is filtered by two capacitors C3 and C4 connected in series, the common terminal of which again defines a mid-voltage level. This common terminal is, for example, connected to the mid-voltage level of step-up converter circuit H. This connection is not absolutely necessary and is therefore represented in FIG. 1 by a dashed connection. A grounding is possible at this location, but is omitted in the represented exemplary embodiment for the reasons mentioned above.

Dynamic intermediate circuit Z is followed by a step-down converter circuit T, which includes, e.g., conventional, step-down converters for converting, as needed, the positive or negative dynamic intermediate circuit voltage +U_ZH and −U_ZH, respectively, to a lower voltage U_Netz currently required in network N with the aid of a pulsed operation of semiconductor switch element T2 and T6, respectively. During the positive half-cycle of network N, the voltage is obtained from the positive potential +U_ZH of dynamic intermediate circuit Z, and during the negative half-cycle of network N from the negative potential −U_ZH of dynamic intermediate circuit Z. Freewheeling occurs respectively via the appropriately switched semiconductor switch elements T3 and T4 to or from the mid-voltage level of the dynamic intermediate circuit. For this purpose, freewheeling diodes D3 and D4 are connected in series to switch elements T3 and T4, respectively. During the positive half-cycle of the network voltage, T3 is conductive, while T4 is blocking. During the negative half-cycle, T3 is blocking, while T4 is conductive.

The two step-down converters for the positive and negative network voltage are arranged symmetrically to the mid-voltage level and form step-down converter circuit H in FIG. 1.

The actual supply of power to network N occurs via a network choke L3.

Figure 2:
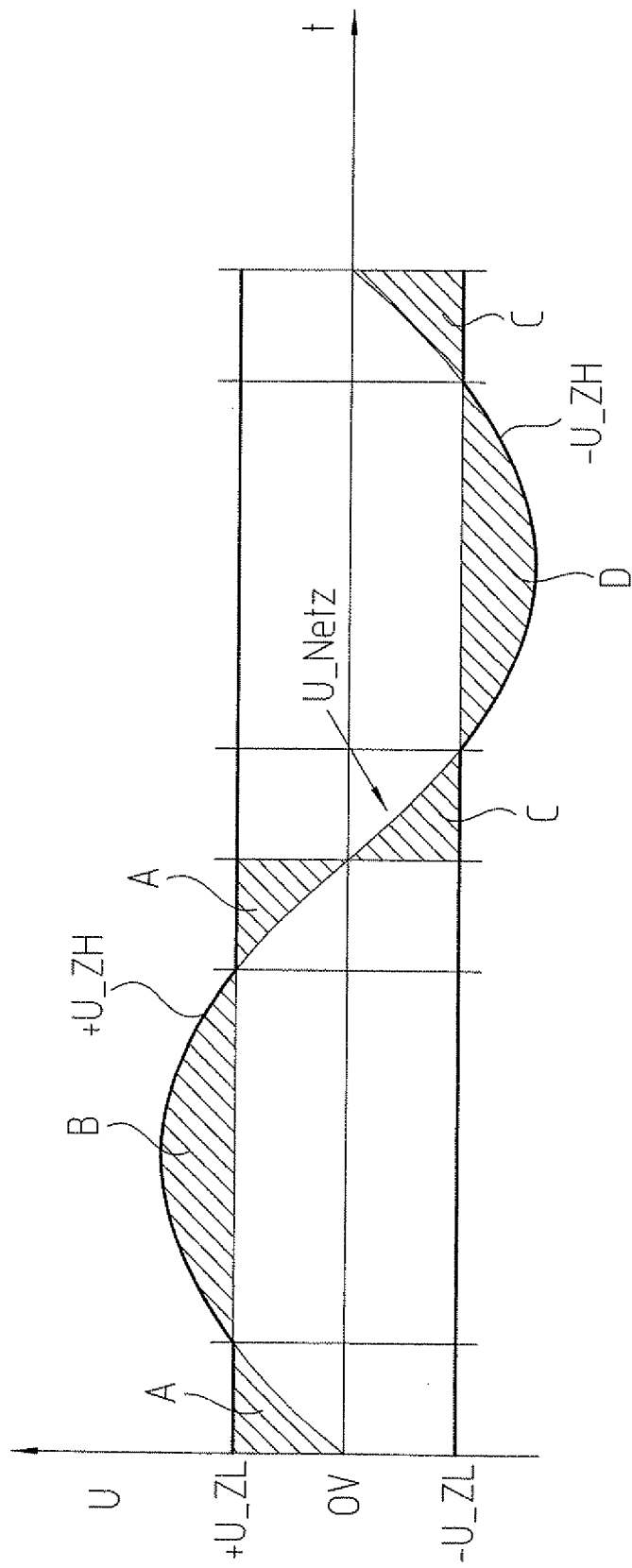
FIG. 2 illustrates various operating ranges of the inverter during a period of the network phase.

FIG. 2 represents the various operating states of the solar inverter circuit in the event that the positive or negative generator voltage +U_ZL and −U_ZL, respectively, is lower in absolute value than the maximum positive or negative voltage in network N. In other words, the generator voltage is lower than the peak-to-peak maximum of the network voltage.

In the ranges indicated by A in the positive half-cycle of network voltage U_Netz, the required supply voltage is below the voltage delivered by the generator. Dynamic intermediate circuit Z is charged during this time via D1 by generator G, which means that the positive intermediate circuit potential +U_ZH corresponds to positive generator voltage +U_ZL. During this time period, the upper step-down converter of step-down converter circuit T is in operation, while step-up converter circuit H is not in operation.

In range B in the positive half-cycle of network voltage U_Netz, the required supply voltage is above the voltage delivered by the generator. The upper step-up converter of step-up converter circuit H is in operation and increases the positive generator voltage +U_ZL to a value +U_ZH, which is applied via D2 to the dynamic intermediate circuit, while D1 disconnects generator G from dynamic intermediate circuit Z. For this purpose, the step-up converter is operated just so that +U_ZH corresponds to the currently required power supply voltage. FIG. 2 shows that in region B dynamic intermediate circuit voltage +U_ZH just follows the sine of network voltage U_Netz. Thus it is not necessary to operate step-down converter circuit T, and unnecessary switching losses through a simultaneous operation of step-up converter circuit H and step-down converter circuit T are avoided.

For controlling the step-up converters and step-down converters, control circuits are used, e.g., in a conventional manner, which determine suitable control patterns for the various semiconductor switch elements on the basis of the setpoint voltages and actual voltages.

For the negative half-cycle of the network voltage, the operation of the inverter circuit is repeated analogously for ranges C, in which only the lower step-down converter of step-down converter circuit T is in operation, and range D, in which only the lower step-up converter of step-up converter circuit T is in operation, in order to increase the negative generator voltage −U_ZL in terms of absolute value just to the required power supply voltage. Again it is possible to avoid the simultaneous operation of step-up converter circuit T by providing a sinusoidal voltage −U_ZH in range D.

The circuit illustrated in FIG. 1 is suitable for converting the direct voltage of a solar generator or a so-called string, that is, a series connection of multiple solar modules, into an alternating voltage for supplying power to a network phase. This may be sufficient for smaller installations of a few kilowatts of power output. For photovoltaic installations of a higher power output, however, a power supply to all three phases of a supply network is required. Moreover, a series connection of too many solar modules in a string is not possible since the maximum system voltage in solar modules must not exceed 1,000 V (open-circuit operation). The operating voltage is thus limited to approximately 750 V. In installations of higher output, multiple strings are therefore operated in parallel. For this purpose, it is desirable that each string is able to be operated separately from the other strings at the maximum power point, that is, that current and voltage are separately selectable for each string.

These requirements may be fulfilled with the circuit illustrated in FIG. 1 by a simple extension.

Figure 3:
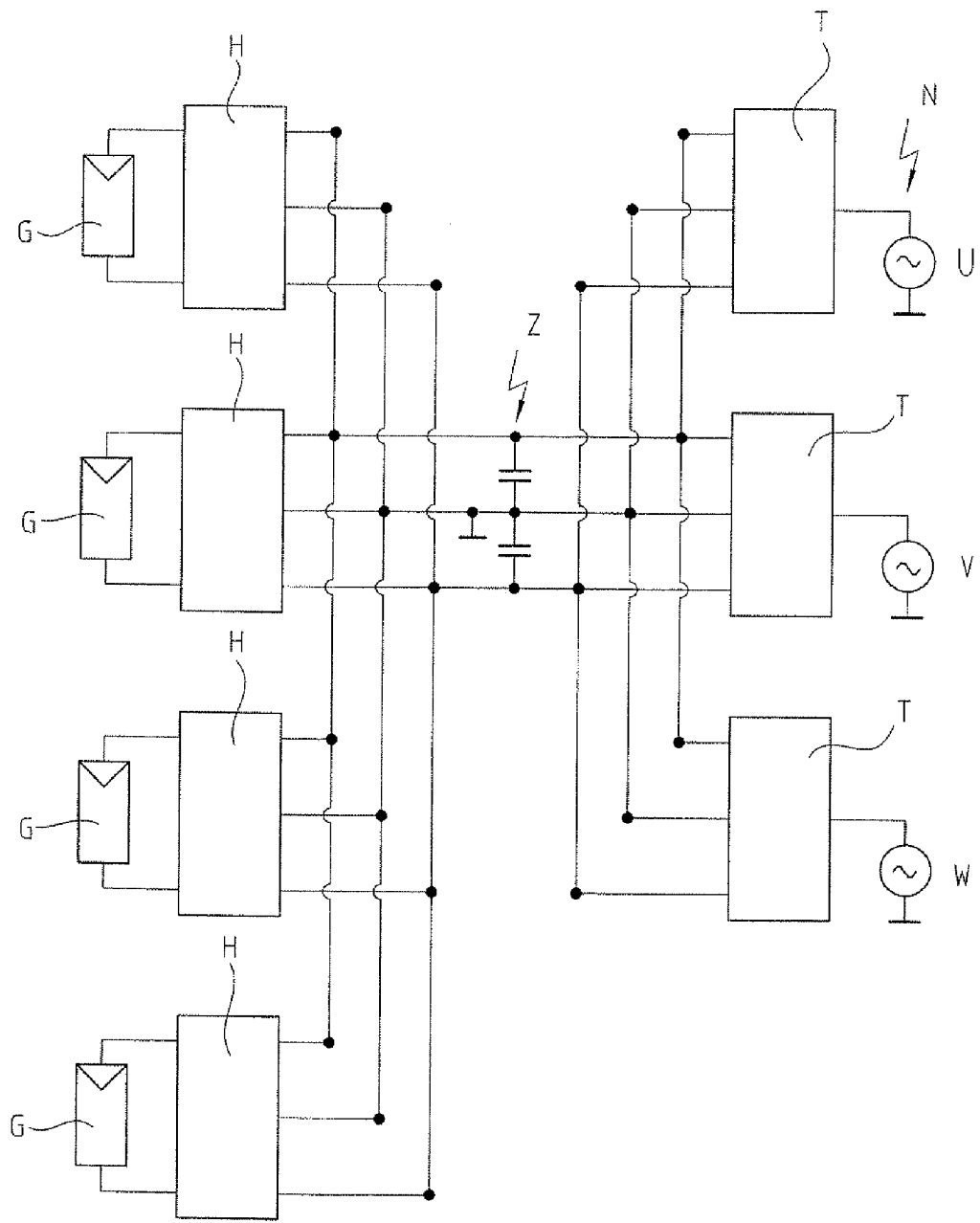
FIG. 3 schematically illustrates a solar inverter circuit for multiple voltage sources and three network phases.

According to FIG. 3, a step-up converter circuit H as illustrated in FIG. 1 is provided for each string G (four strings G are illustrated, but this number may also be greater or smaller). This makes it possible to operate each string G at the respective maximum power point.

All step-up converter circuits H supply a common dynamic intermediate circuit Z, the structure of which corresponds to that illustrated in FIG. 1. The step-up converter circuits are connected in parallel to one another.

Dynamic intermediate circuit Z is followed by one step-down converter circuit T for each phase U, V, W of network N, from which the respective network phase is supplied. When three-phase networks are to be supplied with power, as is usual, three such step-down converter circuits T are required. These are, in turn, connected in parallel to one another. Inside, both step-up converter circuits H and step-down converter circuits T are constructed as illustrated in FIG. 1, and thus FIG. 3 only shows the respective terminals and their mutual connection.

This type of parallel interconnection of multiple step-up converter circuits H for supplying power to a common dynamic intermediate circuit Z brings with it a modification in the operation of the individual step-up converter circuits H. First, the respective string G that currently supplies the highest output voltage is the so-called master string. This master string or, more precisely, its associated step-up converter circuit H, is operated as explained with reference to FIG. 1, but there is the rule that step-up converter circuit H is active whenever the voltage of this master string falls below the highest of the three currently required power supply voltages. Thus, step-up converter circuit H must be directed to the currently highest voltage of all network phases. Thus, if the string voltage is below the peak voltage in the network, as in FIG. 2, then step-up converter circuit H is required much more frequently and possibly permanently, although it is still the case that the respective step-up converter H follows the sinusoidal form of the currently highest network voltage such that in this operating state no step-down converter T has to become active at least for this phase. For supplying power to the remaining phases, a simultaneous operation of step-up converters H and step-down converters T is possibly necessary, but is reduced to what is absolutely necessary.

The remaining strings G and their step-up converter circuit H should always supply the same voltage to dynamic intermediate circuit Z as the master string. For this purpose, the respective step-up converters H are operated permanently. In so doing, they either generate a constant voltage level—that of the master string—or they likewise follow—like step-up converter H of the master string—the sinusoidal form of the currently required highest supply voltage.

An advantage of the circuit illustrated in FIG. 1 or FIG. 3 is that semiconductor switch elements T2, T3, T4 and T6 of the step-down converter circuit may also be controlled such that the power is supplied via the mid-voltage level. For example, at a negative network voltage, a positive current may be supplied from the mid-voltage level, while free-wheeling occurs via −U_ZH. This makes it possible to change the phase angle of the supplied current and thus reactive power may be supplied to the network. This is a demand on the part of the network operators, who are able to react more flexibly to the respective reactive power requirement due to ever greater contributions of solar or wind power.

What is claimed is:

1. A method for operating an inverter for converting a direct current voltage of a solar generator into an alternating current voltage for supplying power to a network, the inverter including a step-up converter circuit, a dynamic intermediate circuit, and a step-down converter circuit, comprising:
   increasing, by the step-up converter circuit, the direct current voltage if the direct current voltage is lower than a peak-to-peak maximum of the network voltage;
   lowering, by the step-down converter circuit, an intermediate circuit voltage, as needed, to a lower voltage currently required in the network; and
   dynamically increasing, by the step-up converter circuit, the direct voltage to a value currently required in the network and temporarily supplying an approximately sinusoidal voltage curve for the intermediate circuit voltage.

2. The method according to claim 1, further comprising raising, by the step-up converter circuit, one of (a) a positive and (b) a negative voltage level of the solar generator with respect to a mid-voltage level in terms of absolute value to the value currently required in the network and increasing a dynamic intermediate circuit voltage to the raised value if one of (a) the positive and (b) the negative voltage level is lower in terms of absolute value than the voltage currently required in the network with respect to the mid-voltage level.

3. The method according to claim 1, further comprising supplying a plurality of network phases with power from the dynamic intermediate circuit, wherein a separate step-down converter circuit is supplied with power from the dynamic intermediate circuit for each phase.

4. The method according to claim 3, wherein the plurality of network phases consists of three phases.

5. The method as recited in claim 3, further comprising dynamically regulating, by the step-up converter, to a highest power supply voltage currently required in the network phases if the direct current voltage is below the highest power supply voltage.

6. The method according to claim 1, further comprising supplying power, by multiple solar generators, to the dynamic intermediate circuit via a respectively associated step-up converter circuit.

7. The method according to claim 6, wherein the solar generator that supplies a currently highest direct voltage constitutes a master string, the method further comprising supplying, by step-up converter circuits associated with remaining solar generators, a voltage that corresponds to the voltage supplied by at least one of (a) the master string and (b) the step-up converter associated with the master string to the dynamic intermediate circuit.

8. An inverter for converting a direct current voltage of a solar generator into an alternating current voltage for supplying power to a network, comprising:
   a step-up converter circuit;
   a dynamic intermediate circuit; and
   a step-down converter circuit;
   wherein the step-up converter circuit is adapted to increase the direct current voltage if the direct current voltage is lower than a peak-to-peak maximum of the network voltage;
   wherein the step-down converter circuit is adapted to lower an intermediate circuit voltage, as needed, to a lower voltage currently required in the network; and
   wherein the step-up converter circuit is adapted to dynamically increase the direct current voltage to the value currently required in the network and to temporarily supply an approximately sinusoidal voltage curve for the intermediate circuit voltage.

9. The inverter according to claim 8, wherein a plurality of solar generators, each having an associated step-up converter circuit, are arranged to supply power to the dynamic intermediate circuit.

10. The inverter according to claim 8, wherein the dynamic intermediate circuit is adapted to supply a plurality of network phases with power via step-down converter circuits respectively associated with the network phases.

* * * * *